April 22, 1941.  E. E. WEMP  2,239,162
CLUTCH
Filed April 23, 1932   3 Sheets-Sheet 1
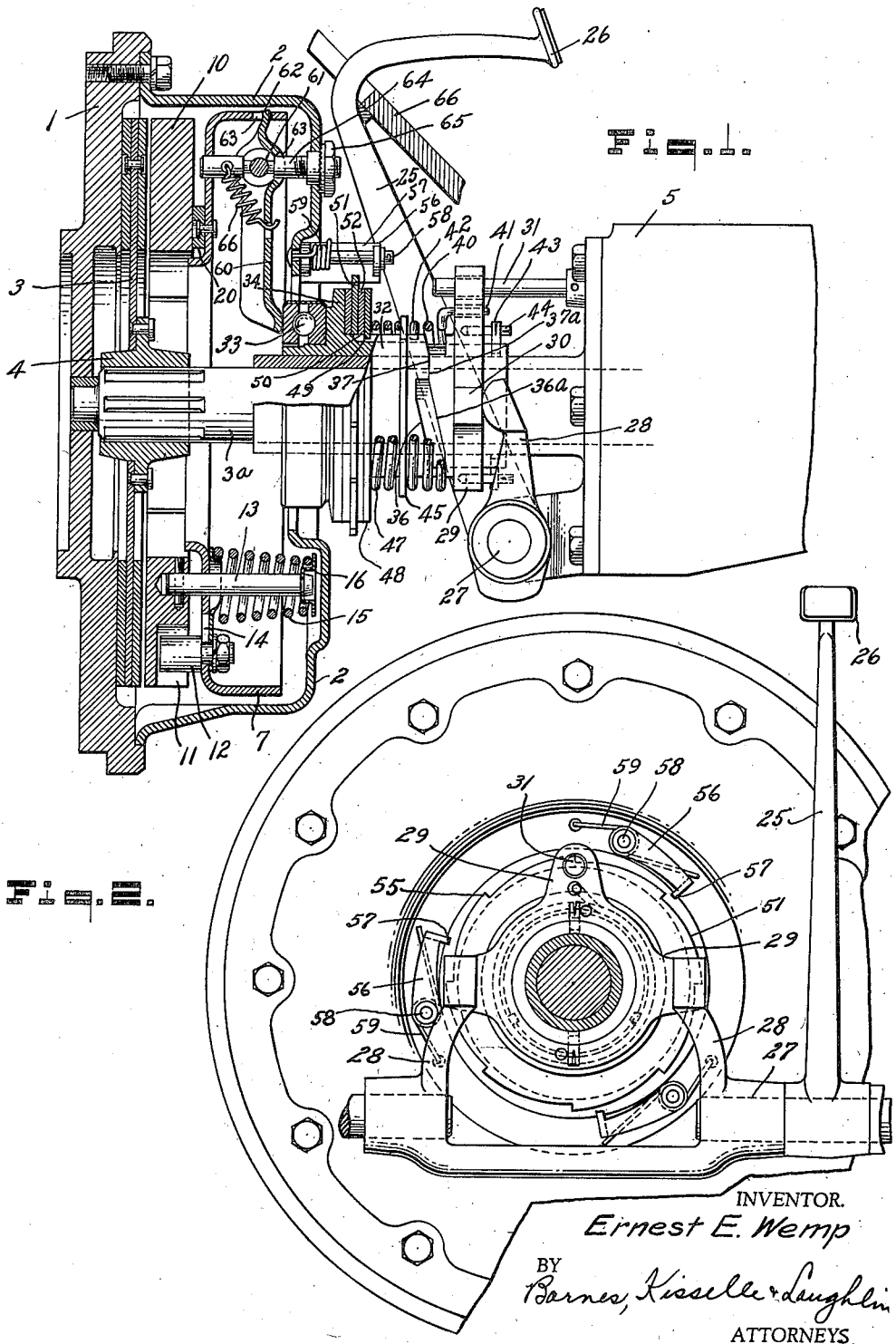
INVENTOR.
Ernest E. Wemp
BY
Barnes, Kisselle & Laughlin
ATTORNEYS.

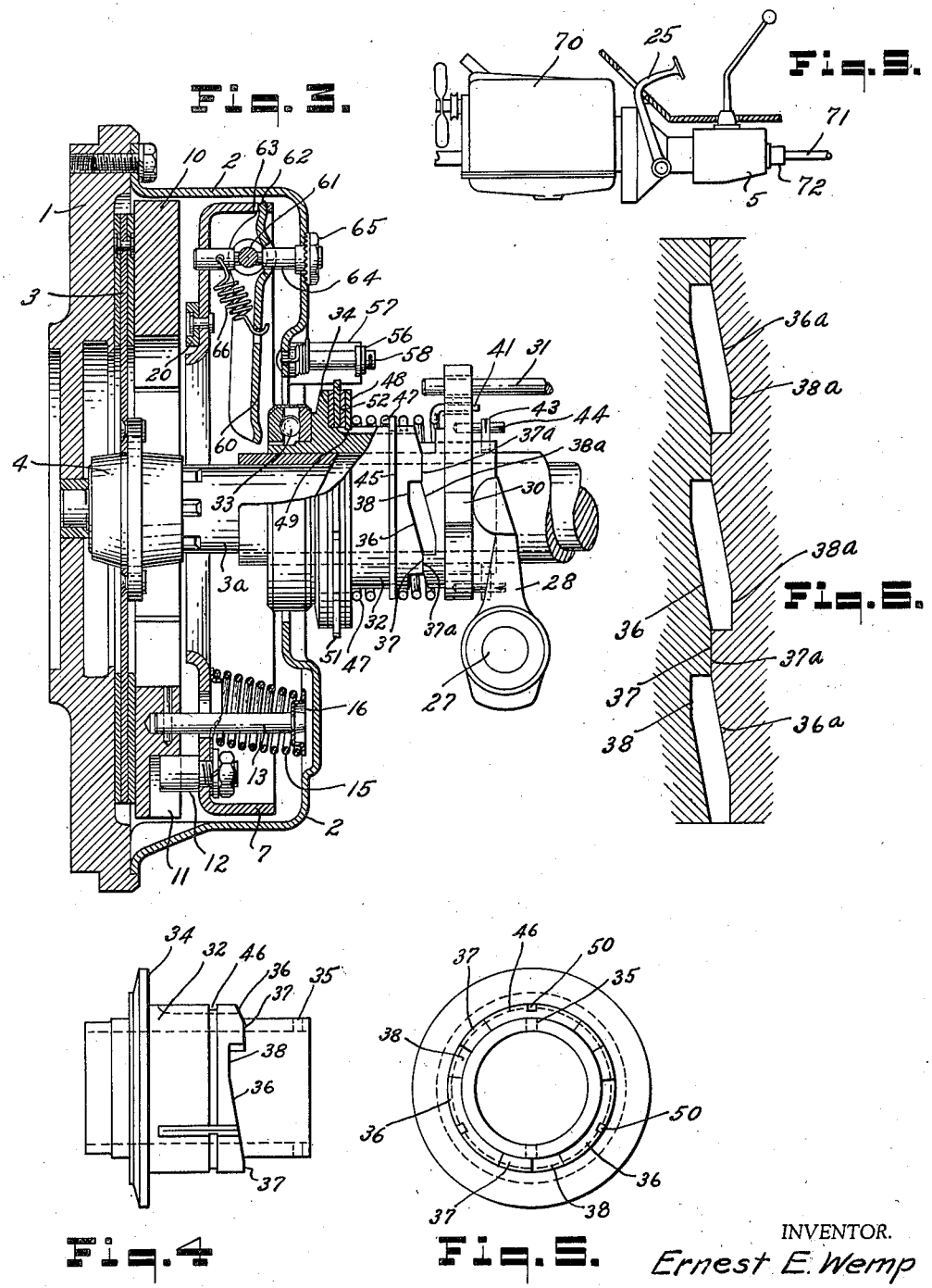

April 22, 1941. E. E. WEMP 2,239,162
CLUTCH
Filed April 23, 1932 3 Sheets-Sheet 3
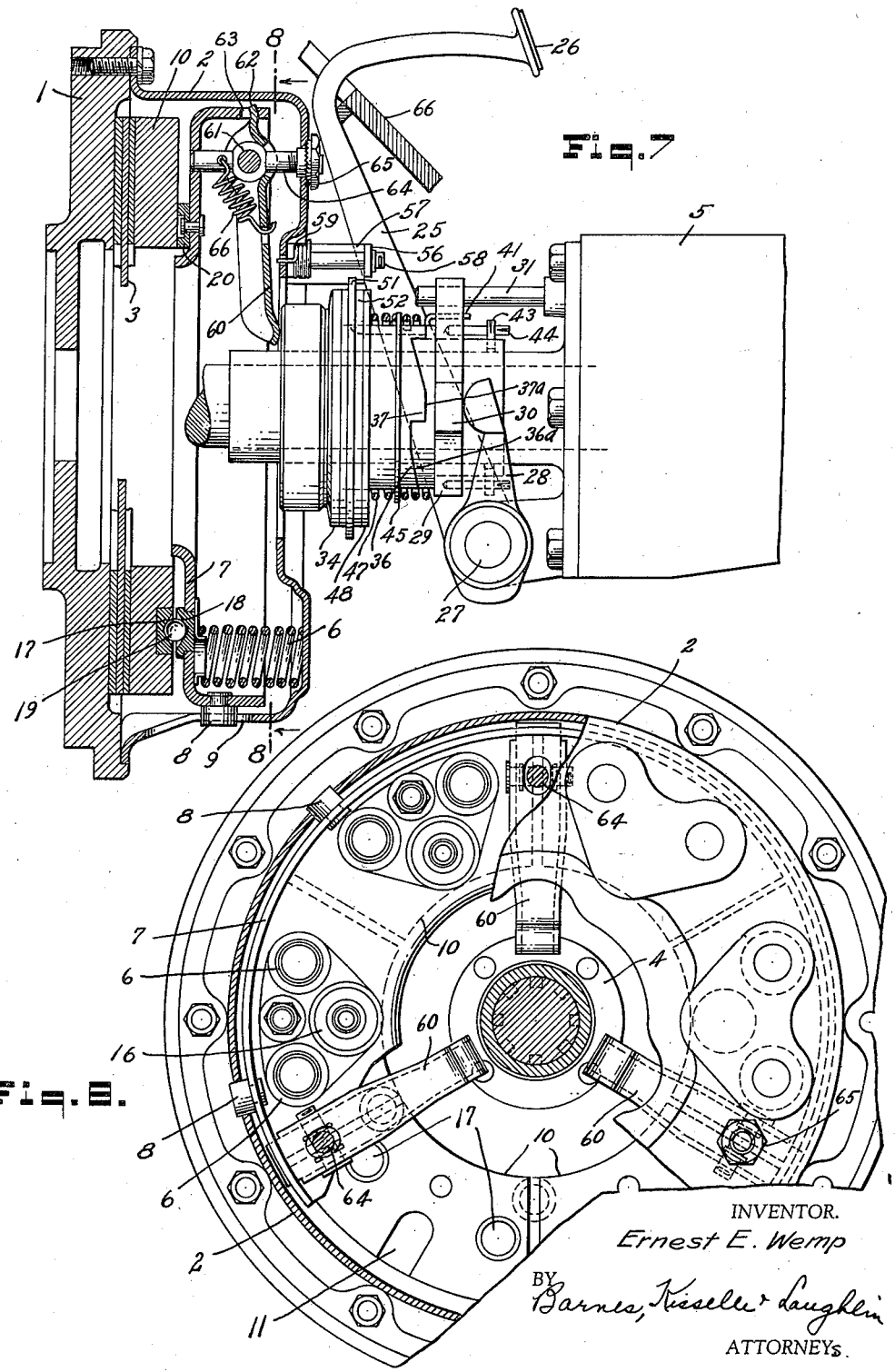
INVENTOR.
Ernest E. Wemp
BY Barnes, Kisselle & Laughlin
ATTORNEYS.

Patented Apr. 22, 1941

2,239,162

UNITED STATES PATENT OFFICE 2,239,162

CLUTCH

Ernest E. Wemp, Detroit, Mich.

Application April 23, 1932, Serial No. 607,064

14 Claims. (Cl. 192—105)

This invention has to do with a clutch especially arranged and designed for use in an automotive vehicle. The objects of the invention include the provision of a clutch which may be termed of a full automatic nature.

The clutch is one designed to automatically engage and disengage incident to motor operation, and in this respect the present clutch utilizes centrifugally controlled elements effective to engage the clutch upon sufficient R. P. M., and to disengage the clutch when the R. P. M. is that of about the usual motor idling speed. It is of course desirable many times to have the clutch engaged when the engine is at rest and the vehicle is parked or allowed to stand. It may be desirable to employ the engine compression as a braking agency at this time, or it may be necessary at times to have the clutch engage in order to start the engine by pushing or towing the vehicle. It is an object of the invention to provide a centrifugal clutch which is engaged when the driving clutch member or members are at rest, and which is disengaged when the driving member or members are at motor idling speed, with the changes in the clutch condition effected entirely automatically, thus requiring no action or judgment on the part of the operator. In accordance with the present invention an arrangement is provided wherein certain operations take place automatically as the engine is stopped in order to permit or effect engagement of the clutch which, normally, is disengaged at normal engine idling speeds. This object and other objects will become more apparent as the detailed description progresses.

Fig. 1 is a sectional view taken through a clutch constructed in accordance with the invention and illustrating some of the automatically acting mechanism.

Fig. 2 is an end view thereof showing some parts in section.

Fig. 3 is a sectional view taken through the clutch illustrating the normal running position of the parts.

Fig. 4 is a detailed view of one of the members.

Fig. 5 is an end view thereof.

Fig. 6 is a view illustrating developed cam agencies, some of which are on the part shown in Figs. 4 and 5.

Fig. 7 is a sectional view of the clutch illustrating the position of the parts when the engine is at rest.

Fig. 8 is a sectional view taken substantially on line 8—8 of Fig. 7.

Fig. 9 is a general view illustrating an automobile engine, transmission and free wheeling unit in which combination the present invention is useful.

The flywheel of an engine is illustrated at 1, and this may constitute one driving member of a clutch; a clutch cover plate is illustrated at 2. A driven disk having clutch facing material, as illustrated at 3, and its hub 4 is mounted upon a driven shaft 3a which may extend into a transmission housing 5. Within the cover plate are clutch packing springs 6 (Fig. 7), a plurality of which may be arranged in an annulus, as shown in Fig. 8, and these springs are backed up by the cover plate and act upon a carrier plate 7. The carrier plate may be driven as by means of studs 8 secured thereto and fitted in slots 9 of the cover.

A pressure ring or clutch driving member may be constituted by a plurality of segmental members 10, and as shown in Fig. 8 there may be six of such segments. Each segment may have a slot 11 into which a driving stud 12 fits and which is carried by the carrier plate 7. A pin 13 may be secured to each segment, as shown in Fig. 1, and the carrier plate may be provided with an elongated aperture 14 for each pin. A spring 15 may surround each pin and is arranged to normally exert an expanding action, being backed up by the carrier plate and exerting its action upon a spring seat 16 carried by the end of the pin. Each segment may have a pair of recesses 17 disposed substantially on its center line between its inner and outer edges, and located in proximity to opposite radial edges of the segment. These recesses, as shown in Fig. 7, may have angular walls substantially of inverted frusto-conical shape. Cooperating recesses of similar form, as shown at 18, may be provided in the carrier plate and the recesses are designed to match in pairs, as shown in Fig. 7, and pocketed in matched recesses is an element such as a ball 19.

A clutch utilizing this recess and ball arrangement is shown in application #592,301, filed February 11, 1932, and in this case such arrangement is claimed broadly. Suffice to say, so far as the present invention is concerned, the spring 15, of which there is one for each segment, urges the segment and carrier plate together or toward each other so that they may take a relative position shown in Fig. 1. As the segments are affected by centrifugal force they shift radially outwardly, the ball 19 rolls upon the inclined faces of the recesses and causes the segments to shift axially as regards the carrier plate 7 into engagement with the driven disk, as shown in Fig. 3, and the pressure of the segments against the driven disk is resisted by the packing springs 6 which back up the carrier plate. The radial outward movement of the segments is limited by the studs 12 striking the bottoms of the notches 11. When centrifugal action lowers or ceases, the springs 15 return the segments to the normal position with the balls 19 engaged in the bottom of the matched recesses and the clutch is disengaged. In the present set-up it will be noted that there is one spring 15 for each segment, and it is located inside of the center line. In order to keep the respective segments from cocking, spacer elements of friction material or the like, as at 20, may be attached to the carrier plate and located, as shown in Fig. 8, to provide a seat bridging the spaces between two adjacent segments.

The clutch is arranged for manual operation, and for this purpose there may be the usual foot lever 25 having a pedal 26 mounted upon shaft 27 for rocking a yoke with arms 28. This yoke engages a reciprocable member 29 through the means of extensions 30 thereon, and the member 29 may be held from rotating by being threaded over a projecting pin 31 which may be carried by the transmission housing. The member 29 constitutes a part of a clutch throw-out member; another part is shown at 32 (Fig. 4) one end of which may be suitably shaped, as shown, for the reception of an antifriction bearing 33, and may be provided with an annular flange 34; one end may be reduced, as at 35, and at the shoulder of the reduced portion are cam elements having lift portions 36, high points 37 and low points 38. There may be three of such elements and a development of the same is shown in Fig. 6. Similarly cooperating elements are formed on the cam member 29, and the same reference characters are applied to the respective cam parts and are identified by the character $a$. The member 29 is mounted for axial reciprocation upon the portion 35 of member 32. A torsion spring 40 may be located, as shown in Fig. 1, with one end 41 hooked into a recess of the member 29, and the other end as at 42 hooked into a groove in the member 32. This torsion spring normally holds the parts 32 and 29 in such relative positions that the high points 37 and 37A of the cam elements ride upon each other as shown in Fig. 1. The torsion spring exerts a force tending to rotate the member 32, and the parts are properly positioned by interengaging studs 43 and 44.

A ring 45 may be seated in a groove 46 and may be arranged to back up a compression spring 47. This spring may act upon a ring 48 keyed to the member 32 by means of the keying parts 49 disposed in grooves 50. Another ring like member 51 is disposed between friction facing material 52 and 53, and these elements are packed between the flange 34 and the ring 48.

By referring to Fig. 2, it will be noted that the ring member 51 is of ratchet formation having teeth 55. Centrifugal elements are arranged to cooperate with these teeth. As shown in Fig. 8, there may be three of such centrifugal elements and each may comprise a pawl shaped member having legs 56 and a bight portion 57, the legs of which are pivoted upon studs 58 carried by the cover plate. A torsion spring 59 is associated with each centrifugal member and is arranged to normally urge the bight portions 57 radially inwardly so that the springs are flexed as the members swing on their pivots incident to centrifugal action. The bight portions 57 are designed to catch the teeth 55.

The antifriction bearing 33 is arranged to engage clutch releasing levers 60 of which there may be three, as shown in Fig. 8. These levers are pivotally mounted, as at 61, and each has an end 62 engaging in a recess 63 in a part of the carrier. The levers may be fulcrumed upon studs 64, opposite ends of which may be seated in the cover plate and carrier plate, as shown, and the studs may be adjusted for position by means of nuts 65. A relatively light spring 66 may be associated with each lever for anti-rattle purposes and for keeping the ends 62 of the levers up against the rearmost wall of the slot 63.

For the purpose of convenience, the lever 25 has been shown on the right hand side of the clutch assembly, as illustrated in Fig. 2. While this would be satisfactory with a right hand drive vehicle, the lever 25 would normally be on the left hand side, as Fig. 2 is viewed. From an operating standpoint, however, the arrangement is the same, and furthermore, the lever as especially shown in Figs. 1, 2 and 7, may be slightly out of normal proportion. The lever may be backed up against a suitable stop as, for example, toe boards 66.

Fig. 1 shows the parts in the position which they take when the vehicle engine is running at idling speed, as for example, about 400 R. P. M. The centrifugal elements 19 are not actuated radially outwardly by the centrifugal force effective at idling speeds, and accordingly, the clutch is open as shown. The packing springs 6 (Fig. 7) are tending to urge the carrier plate 7 toward the flywheel; this in turn tends to rock the levers 60 but the inner ends of the levers 60 contact with the bearing 33. Thus, movement of the carrier plate 7 toward the flywheel is impeded and the clutch remains open. As soon as the engine is accelerated the centrifugal elements 19 shift radially outwardly, and due to the matched pockets and ball arrangement the elements 19 also shift axially and the driven disk is packed between the flywheel and segments 10, as shown in Fig. 3, with a maximum pressure determined by the strength of the packing springs 6. By the radial outward shift of each segment each pin 13 shifts, as illustrated by comparison of Figs. 1 and 3, with the resultant distortion of spring 15. When the clutch is engaged by acceleration of the parts, the inner ends of the levers 60 may move away from the throw-out bearing 33, as shown in Fig. 3. As soon as the engine is brought down to idling speed the parts resume the position shown in Fig. 1 with the clutch disengaged. It will be readily apparent how a vehicle may be operated by this automatic engaging and releasing of the clutch by centrifugal action, and also how the gears of a speed change transmission may be shifted when the clutch is in open position.

When the engine is stopped, certain operations take place automatically, preferably at an R. P. M. less than idling speed or when the motor stops, to permit of clutch engagement in the absence of centrifugal action. The centrifugal members 56 are thrown outwardly into a position shown in Fig. 2, so as to clear the teeth 55 at or over the idling speed. Accordingly, at all times during engine operation members 56 are ineffective. As the engine is about to come to a stop, somewhere between 400 R. P. M. and zero R. P. M., the torsion springs 59 swing the members 56 inwardly and the parts 57 catch the teeth 55. This rotates the ring 59 which, through its packed relation with the member 32, also rotates the member 32, and the high points of the cams 37 and 37A are moved off each other with the result that the member 32 with its throw-out bearing 33 may retract relative to the member 29. Since member 29 does not rotate, the member 32 can rotate relative to member 29 until it is stopped by the abutting of the high points 37 and 37a, in the position shown in Fig. 7. The motor, however, may continue with further rotary movement and at this time the part 51 slips on the facing material 52. It will be appreciated that the member 29 is capable of retracting only to a predetermined point, which point may be determined by a stop such as the floor boards 66 limiting the movement of the lever 25.

As the member 32 rotates, the packing springs 6, which constantly press against the carrier plate 7, shift the carrier plate 7 forwardly and the inner ends of the levers 60 push back upon the bearing 33 and, in effect, aid in the cam surfaces 36 and 36A sliding upon one another, and the cams may take substantially a relative position as illustrated in Fig. 7. Thus the throw-out member, constituted by two primary parts 29 and 32, is capable of variable over-all length so as to impede the lever movement in normal operation, and to permit lever movement when the engine is stopped so that the clutch may be engaged. Accordingly, it will be noted that each time the engine is stopped the clutch is automatically engaged. It may be disengaged at any time by an operator depressing the pedal 26 thus shifting the clutch levers 60 in the usual manner. Likewise, when the parts are in normal clutch engaged and running position, as shown in Fig. 3, the clutch may be disengaged by the shift of a lever. Thus, while the clutch is automatically acting during the running operation, it also becomes automatically engaged when the engine is stopped, and partakes of the conventional clutch which is normally engaged. When the engine is started the members 56 release the teeth 55 upon sufficient centrifugal force and the torsion spring may return the member 32 to its normal position, as shown in Fig. 1, as the levers 60 free the throw-out bearing 33 incident to actuation of the centrifugal clutch members at a higher R. P. M. than is necessary to actuate members 56.

The structure of the present invention is designed for use in an environment, as for example, an automotive vehicle wherein a freewheeling unit is employed. By "free wheeling" is meant there is a one-way drive connection which permits the engine to drive the vehicle yet permits the engine to decelerate while the vehicle is continuing at a relatively high rate of speed and overrunning the engine. Such an arrangement is depicted in Fig. 9 wherein the engine is represented at 70 and the vehicle propeller shaft at 71. Between the propeller shaft and the transmission housing 5 there may be a free wheeling unit in housing 72 which permits the propeller shaft 71 to rotate faster than the engine. The construction of the free wheeling connection may be any one of the commonly known types, as for example, a coil spring or a roller clutch operating on inclined surfaces. As these types are known and in use today no further detail description or showing is thought to be necessary. Accordingly, it will be appreciated that the engine may be decelerated without decelerating the vehicle to permit clutch disengagement, and again accelerated for clutch engagement.

Some of the claims specify that the clutch members are normally disengaged at normal idling speed. This means that in the ordinary and usual operation of the structure, with the engine running at a speed to which it is adjusted for free running, that the clutch is disengaged.

I claim:

1. A clutch comprising in combination a driving member, a driven member, centrifugally controlled means for packing the driving and driven members together above a given idling speed, packing springs normally urging the driving and driven members toward each other, means for impeding the action of the springs to maintain the clutch disengaged at said idling speed, and means acting upon the impeding means automatically, substantially as the driving member is discontinuing operation movement, to permit of clutch engagement independent of centrifugal action.

2. In a clutch, the combination of driving and driven members, clutch throw-out levers, centrifugal means for engaging and releasing the clutch in which action the levers actuate, a movable clutch throw-out member normally limiting the movement of the levers in one direction, and means effective substantially as the driving member comes to rest for rendering the clutch throw-out member ineffective for limiting the lever action in one direction, said last named means comprising centrifugal elements effective only at an R. P. M. relatively low as regards the R. P. M. necessary to actuate the first named centrifugal means.

3. In a clutch, the combination of driving and driven members, clutch packing springs, throw-out levers, a shiftable clutch releasing member acting upon the levers, a manually operable clutch lever operable upon the throw-out member, means for positioning the throw-out member to normally limit the movement of the levers to maintain the clutch disengaged, centrifugal means for engaging and releasing the clutch above and at idling speed respectively, and means operable below idling speed and prior to the time the driving member comes to rest for reducing the effective length of the throw-out member whereby to permit the packing springs to engage the clutch independently of centrifugal action.

4. In a centrifugally and manually controlled clutch, driving and driven clutch members, centrifugal engaging means, clutch throw-out levers, a clutch throw-out member comprising relatively movable parts, a manually operable lever effective upon one part, the other part being effective upon the clutch levers, and means interconnecting the two parts serving to hold them in one workable relation during rotary action of the driving member and effective for shifting the parts into another workable relation substantially at discontinuance of rotary action of the driving member.

5. In a centrifugally and manually controlled clutch, driving and driven clutch members, centrifugal engaging means, clutch throw-out levers, a clutch throw-out member comprising relatively movable parts, a manually operable lever effective upon one part, the other part being effective upon the clutch levers, cam elements on the two parts, and means for shifting the said two parts relatively rotary substantially upon discontinuance of rotary action of the driving member whereby said parts may shift upon said cam surfaces relatively axially.

6. A clutch, comprising in combination driving and driven members, clutch packing springs, centrifugal clutch engaging and releasing elements, a manually operable clutch releasing lever, a clutch throw-out member associated with the levers, another clutch throw-out member associated with the lever, interengaging cam elements on the members, a torsion spring for normally positioning the cam elements in a given relation, and means effective substantially upon stoppage of the driving member for shifting said clutch throw-out parts relatively on said cam surfaces.

7. A clutch, comprising in combination driving and driven members, clutch packing springs, centrifugal clutch engaging and releasing elements, a manually operable clutch releasing lever, a clutch throw-out member associated with the levers, another clutch throw-out member associated with the lever, interengaging cam elements on the members, a torsion spring for normally positioning the cam elements in a given relation, means effective substantially upon stoppage of the driving member for shifting said clutch throw-out parts relatively on said surfaces, said last named means comprising centrifugal elements carried by a driving clutch member, and catch means carried by one of the said throw-out members.

8. A clutch, comprising in combination driving and driven members, clutch packing springs, centrifugal clutch engaging and releasing elements, a manually operable clutch releasing lever, a clutch throw-out member associated with the levers, another clutch throw-out member associated with the lever, interengaging cam elements on the members, a torsion spring for normally positioning the cam elements in a given relation, means effective substantially upon stoppage of the driving member for shifting said clutch throw-out parts relatively on said cam surfaces, said last named means comprising centrifugal elements carried by a driving clutch member, and catch means carried by one of the said throw-out members, said catch means comprising a rotary element frictionally engaged on said clutch throw-out member.

9. A clutch, comprising in combination driving and driven members, clutch packing springs, centrifugal means for engaging and releasing the clutch, clutch throw-out levers, and a manually operable clutch releasing lever, a reciprocable clutch throw-out member actuated by the lever and operable upon the clutch throw-out levers, said throw-out members comprising two parts having interengaging cam surfaces, means for holding one part against rotation, a torsion spring for holding the other part in a normal position as regards the first with the cam surfaces on high points, a friction disk carried by a second mentioned clutch throw-out member, catch devices on the friction disk, and centrifugal means movable into engagement with the catches just prior to discontinuance of rotation of the driving member for rotating the throw-out member parts relative to each other so that they may shift relatively axially.

10. A clutch, comprising in combination driving and driven members, clutch packing springs, centrifugal means for engaging and releasing the clutch, clutch throw-out levers, and a manually operable clutch releasing lever, a reciprocable clutch throw-out member actuated by the lever and operable upon the clutch throw-out levers, said throw-out members comprising two parts having interengaging cam surfaces, means for holding one part against rotation, a torsion spring for holding the other part in a normal position as regards the first with the cam surfaces on high points, a friction disk carried by a second mentioned clutch throw-out member, catch devices on the friction disk, centrifugal means movable into engagement with the catches just prior to discontinuance of rotation of the driving member for rotating the throw-out member parts relative to each other so that they may shift relatively axially, and spring means acting upon the said last named centrifugal means urging the same into engagement with the catch devices.

11. The combination with the fly wheel of an internal combustion engine, which fly wheel constitutes a driving rotary clutch member, a driven clutch member, centrifugally controlled means effective above the idling speed of the engine for engaging the clutch members and adapted to permit disengagement of the clutch members substantially at idling speed, spring means tending normally to engage the clutch members, means for holding the clutch members disengaged against the action of said springs, whereby the clutch members may disengage substantially at engine idling speed, and means operated substantially by the discontinuance of the rotation of the driving member for acting upon said holding means and for rendering the same ineffective for holding the clutch members disengaged, whereby said spring means may pack the driving and driven members into clutching engagement when the parts are at rest.

12. In a clutch, the combination of rotary driving and driven members, clutch throw-out levers, centrifugal means for engaging and releasing the clutch, in which action the levers actuate, a movable clutch throw-out member normally limiting the movement of the levers in one direction, spring means tending to pack the clutch members together, the action of which is normally impeded by the said throw-out member, means operable upon discontinuance of rotation of the driving member for rendering the clutch throw-out member ineffective for limiting the movement of the levers, whereby the clutch becomes automatically engaged substantially when the parts come to rest, and means for automatically conditioning the throw-out member so that the same will limit the lever movement when the driving member is again set into rotation.

13. The combination with the flywheel of an internal combustion engine, which flywheel constitutes a driving clutch member, of a driven clutch member, centrifugally controlled means effective above the idling speed of the engine for engaging the clutch members, spring means tending to engage the clutch members, means for holding the clutch members disengaged against the action of said spring means, and means automatically operable substantially as the flywheel comes to rest for rendering said holding means ineffective, whereby said spring means may pack the driving and driven members into clutching engagement and maintain such engagement while the parts are at rest.

14. A clutch comprising in combination, a driving member, a driven member, centrifugally controlled means for packing the driving and driven members together above a given idling speed, packing means tending to pack driving and driven members together, means for impeding the action of the packing means to maintain the clutch disengaged at said idling speed, said impeding means being capable of being rendered effective and ineffective, and automatically operable actuating means active upon the impeding means to render the same ineffective, so that the driving and driven members may be packed together when the driving member is in an at rest condition, and to render the impeding means effective, so that the driving and driven members may be maintained disengaged when the driving member has resumed operation from an at rest condition.

ERNEST E. WEMP.